W. JOHNSON.
Lathe Chucks.
No. 141,276.
Patented July 29, 1873.
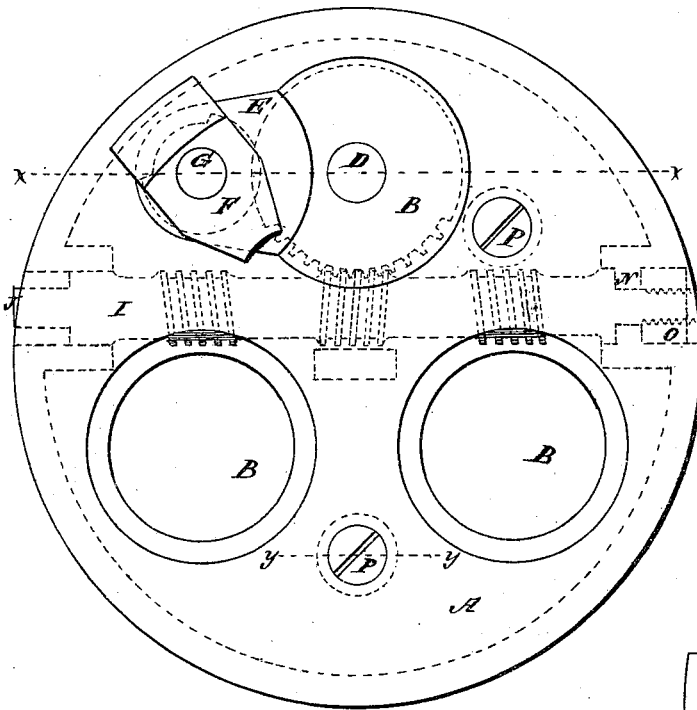
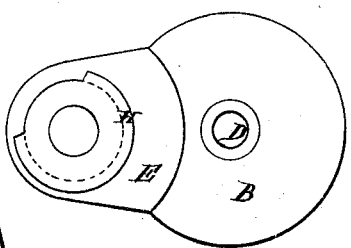
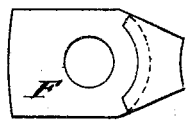
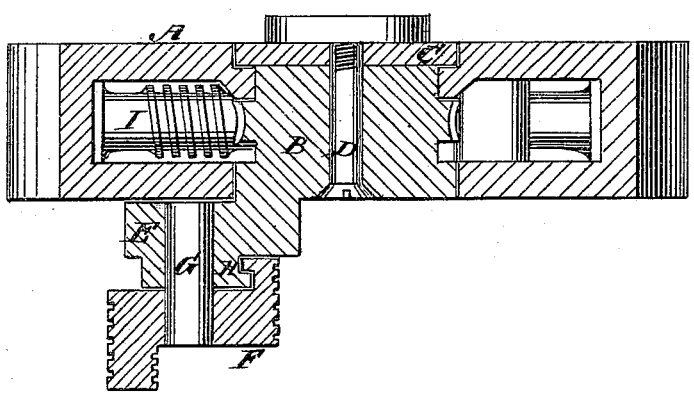
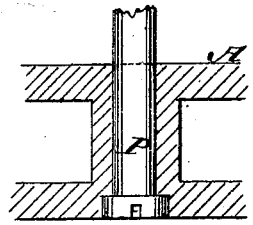
Witnesses.
Inventor.

UNITED STATES PATENT OFFICE.

WILLIAM JOHNSON, OF LAMBERTVILLE, NEW JERSEY.

IMPROVEMENT IN LATHE-CHUCKS.

Specification forming part of Letters Patent No. 141,276, dated July 29, 1873; application filed March 22, 1873.

*To all whom it may concern:*

Be it known that I, WILLIAM JOHNSON, of Lambertville, in the county of Hunterdon and State of New Jersey, have invented a new and useful Improvement in Universal Lathe-Chucks, of which the following is a specification:

The invention consists in the improvement of lathe-chucks, as hereinafter described and pointed out in the claims.

In the accompanying drawing, Figure 1 is a face view of the chuck with the interior parts indicated by dotted lines. Fig. 2 is a cross-section of Fig. 1 taken on the line $x\ x$. Fig. 3 is a detail of the worm-wheel arm to which the jaw is attached. Fig. 4 is a detail view of the jaw. Fig. 5 is a section taken on the line $y\ y$, showing the manner of attaching the chuck to the face-plate of the lathe.

Similar letters of reference indicate corresponding parts.

A is the shell or body of the chuck. The body or shell of the ordinary chuck is made in two parts nicely fitted and bolted together. I improve upon this plan by casting the shell in a single piece, thus securing strength and lightness, and saving much labor and expense. To this shell I attach three worm-wheels, B, which are made to revolve on their respective arbors or centers at equal distance from the center of the chuck or axis of the lathe and from each other. These wheels are confined to the shell by plates C, which revolve with the wheels and the screw D, as seen in Fig. 2. On each of the wheels is an arm, E, which projects out and over the face of the chuck, to which the holding-jaws F of the chuck are attached. G is a steel pin in each of the arms. The arms are made with grooves and lips H, which grooves and lips do not extend entirely round the arm, as seen in Fig. 3. The jaws are also grooved to fit the arm, as seen; but when they are turned round on the arm to a certain position they can be removed from the pin at will. When the worm-wheels are turned the jaws when thus attached to the arms will be carried toward or from the axis of the lathe, as may be desired. These wheels are revolved by means of the worm-screw I, which is made to engage with the worm-wheels, as represented in Fig. 1—two wheels upon one side of the screw and one upon the other. This screw is turned by means of a wrench on the end J. Its other end has a bearing in the shell with a shoulder, N, and a nut, O, which nut is inserted from the outside or rim of the chuck. By this arrangement all dirt and dust are excluded. The chuck is attached to the face-plate of the lathe by means of the screws P. (See Fig. 5.)

Having thus described my invention, I claim as new and desire to secure by Letters Patent—

1. A worm-wheel, B, having a perforated arm, E, clamped to and combined with a chuck-jaw to turn therewith, in the manner described.

2. The holder E having lip and groove H extending only partially around it, in combination with a correspondingly-constructed chuck-jaw, F, to allow the jaw to be removed or attached, in the manner set forth.

3. A wheel, B, plate C, and screw-bolt D, combined with and turning on bearings in the case A, as and for the purpose described.

WILLIAM JOHNSON.

Witnesses:
J. HAYHURST,
R. HAMMELL.